United States Patent [19]

Washizuka et al.

[11] Patent Number: 4,809,192

[45] Date of Patent: Feb. 28, 1989

[54] AUDIO OUTPUT DEVICE WITH SPEECH SYNTHESIS TECHNIQUE

[75] Inventors: Isamu Washizuka, Kyoto; Kosuke Nishimura, Yamatokoriyama; Mitsuhiro Saiji, Kyoto, all of Japan

[73] Assignee: Sharp Kabushiki Kaisha, Osaka, Japan

[21] Appl. No.: 80,541

[22] Filed: Jul. 31, 1987

Related U.S. Application Data

[60] Division of Ser. No. 867,603, May 27, 1986, Pat. No. 4,701,862, which is a continuation of Ser. No. 296,546, Aug. 26, 1981, abandoned.

[30] Foreign Application Priority Data

Aug. 27, 1980 [JP] Japan ................................. 55-118649

[51] Int. Cl.[4] .............................................. G10L 5/00
[52] U.S. Cl. .................................... 364/513.5; 381/51

[58] Field of Search .................................... 381/51-53; 364/573.5, 419, 436; 434/153, 201, 157, 167

[56] References Cited

U.S. PATENT DOCUMENTS

| | | | |
|---|---|---|---|
| 3,559,183 | 1/1971 | Sussenguth | 340/172.5 |
| 3,940,741 | 2/1976 | Horikoshi et al. | 340/172.5 |
| 4,200,927 | 4/1980 | Hughes et al. | 364/200 |
| 4,370,711 | 1/1983 | Smith | 364/200 |
| 4,435,756 | 3/1984 | Potash | 364/200 |
| 4,477,872 | 10/1984 | Losq et al. | 364/200 |
| 4,695,962 | 9/1987 | Goudre | 364/513.5 |

Primary Examiner—Emanuel S. Kemeny
Attorney, Agent, or Firm—Birch, Stewart, Kolasch & Birch

[57] ABSTRACT

In a language translator with a speech synthesizer, fixed words and variable words messages with translation are selectable.

2 Claims, 7 Drawing Sheets

FIG. 6 input control sin

FIG. 7

AUDIO OUTPUT DEVICE WITH SPEECH SYNTHESIS TECHNIQUE

This application is a divisional of copending application Ser No. 867,603 filed on May 27, 1986, now U.S. Pat. No. 4,701,862, which is a continuation of Ser No. 296,546 filed Aug. 26, 1981 now abandoned.

BACKGROUND OF THE INVENTION

This invention relates to an audio output device and more particularly to an audio output device suitable for an electronic translator which provides a verbal output of a translated word or sentence, a talking timepiece which provides a verbal alarm when updated time reaches a time setting and so forth.

Conventional speech synthesizing for an electronic translator or timepiece is achieved by analyzing humam voices, effecting information compression, loading thousands of pieces of voice information into a ROM and synthesizing human voices through the associated pieces of the voice information fetched from the ROM. Although these devices are capable of pronouncing a considerable number of words or phrases with a memory of a relatively small capacity, it is obvious that the number of outputtable words or phrases is inevitably limited because the voice information is stored in a fixed or permament fashion in the memory. In particular, it is impossible to synthesize proper nouns such as personal names because they are not stored in the memory in advance. It is therefore impossible to output an audio message including such a proper noun when alarm setting is reached.

The audio output device will be increasingly used in electronic translators and talking timepieces if words with a very low frequency of occurrence such as proper nouns may be easily audibly outputted.

OBJECT AND SUMMARY OF THE INVENTION

Accordingly, it is a primary object of the present invention to provide an audio output device which fulfills the above described requirements.

Briefly speaking, according to the present invention, thousands of pieces of voice information are fixedly or permanently stored in a memory and one or more words pronounced via an operator's mouth is converted into a form equivalent to that of those peices of permanently stored voice information and stored temporarily in a memory or the like. When it is desired to provide an audio output, a family of the pieces of the permanently stored voice information and a family of the pieces of the temporarily stored voice information are fecthed in a desired order and both combined to output an audible indication of a full phrase or sentence.

A typical example of applications of the present invention will be described. For example, when it is desired to translate "KORE WA SWEDEN DE KAIMASHITA" into an English sentence and pronouce such an English equivalent with an electronic translator, a similar sentence "KORE WA (IGIRISU) DE KAIMASHITA" is fetched and "SWEDEN" is introduced into the parenthetical word section. This results in modifying the standard sentence into "KORE WA (SWEDEN) DE KAIMASHITA" for the delivery of audible output. However, in the event that "SWEDEN" is not present in a memory, the user may direct voice sounds characteristic of "SWEDEN" toward the translator and push a sound key to deliver an audible indication "I BOUGHT THIS IN SWEDEN." In this case, "I BOUGHT THIS IN" will be delivered in the form of human synthesized voice and "SWEDEN" will be delivered in the user's own voice which has been stored temporarily.

The above described and other objects and features of the present invention will be more clearly understood from a review of the following detailed description with reference to the drawings.

DETAILED DESCRIPTION OF THE INVENTION

Figure 1:
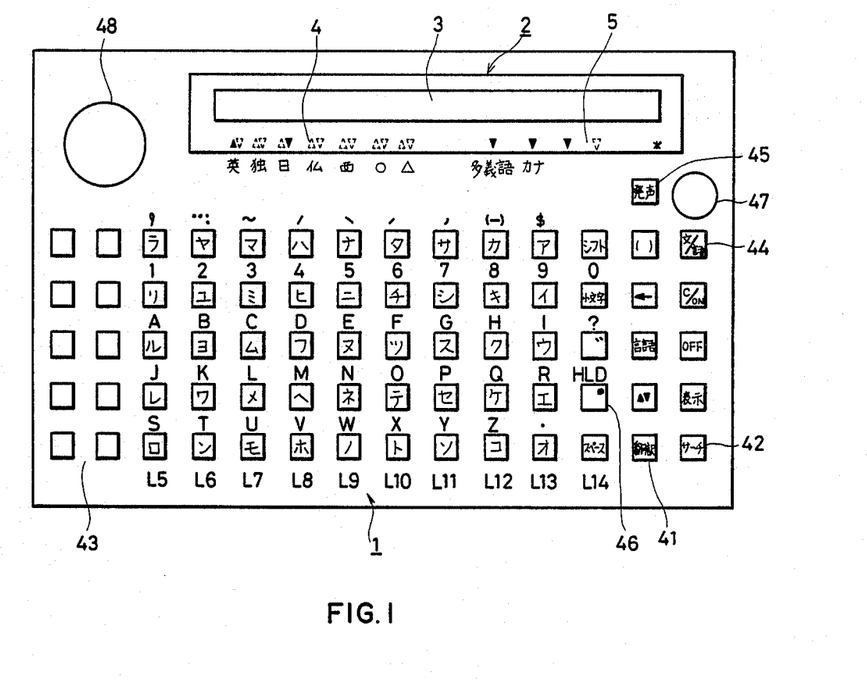
FIG. 1 is a plan view showing an embodiment of the present invention.

Referring now to FIG. 1, there is illustrated in a plan view an embodiment of the present invention, which contains a keyboard 1 consisting of a plurality of character keys for introduction of alphabets, katacanas or symbols and a plurality of function keys for selection of various functions including translation. A translation key 41 actuates the translator to execute translation of a sentence introduced via the alphabet keys. A search key 42 is actuated for retrieval of a word to be translated. Category keys 43 are actuated to classify sentences into any one of several groups, for example, a group of sentences necessary for conversations in airports, or a group of sentences necessary for conversations in hotels. A sentence/word key 44 is actuated to modify a word within parentheses. A sound key 45 is actuated to announce a translated sentence or word in the form of human voices. A hold (HLD) key 46 is also used to modify a word within the parentheses.

A display 2 includes a character display section 3, a language display section 4 for displaying in a symbolic form which language is selected for use and a display 5 for displaying various symbols indicative of operational conditions of the translator. The character display 3 is of a 35 dot (5×7) pattern per digit. There is further provided a microphone 47 and a loudspeaker 48, with the former being adapted to convert words introduced via the user's mouth into voice information in a form compatible with the translator and the latter for delivering an audible output in human voices.

Figure 2:
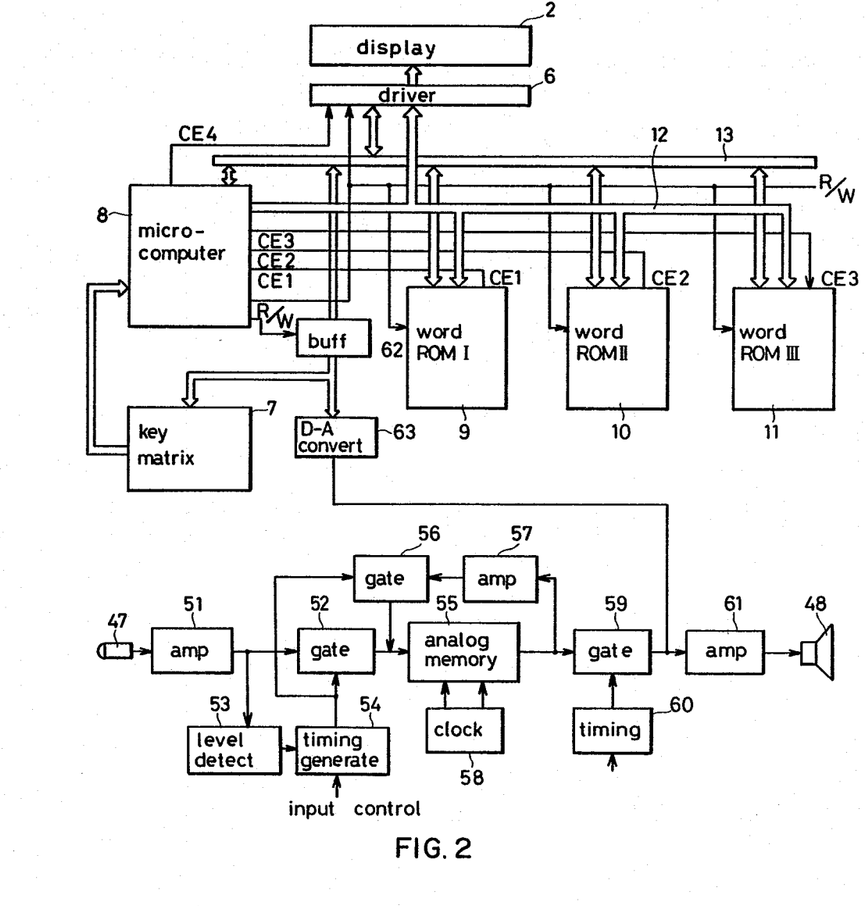
FIG. 2 is a block diagram schematically showing the circuit of the embodiment of FIG. 1.

FIG. 2 is a block diagram showing a circuit configuration of the illustrated embodiment of the present invention. Whether characters or symbols are displayed or not on the display 2 is determined by output signals supplied from a display driver control 6. A key matrix circuit 7 is operatively connected to the keyboard 1 of FIG. 1, to a buffer 62 as described below and key input terminals of a one-chip microcomputer 8 forming a fectching means. Word ROMs 9 through 11 are adapted to store digitally encoded pieces of voice information characteristic of sentences, words and sound inputs. In this embodiment, the word ROMs corresponds to each of a language library (in other words, the word ROM 9 is provided for English, the word ROM 10 for Japanese and the word ROM 11 for German). The word ROM 9 (English ROM) is a non-exchangeable ROM, while the word ROMs 10 and 11 are freely exchangeable as a module.

These word ROMs 9, 10 and 11 are connected to the one-chip microcomputer 8 by means of an address bus 12 and a data bus 13. If any one of the word ROMs 9, 10 and 11 is selected by chip select signals $CE_1$, $CE_2$ and $CE_3$, then it becomes possible to fetch sentences and words from the selected one of the word ROMs for the one-chip microcomputer 8. A chip select signal $CE_4$ is a select signal for the display driver control 6. A read/write signal is used to indicate whether read or write operation is requested.

The buffer 62 is adapted to temporarily store key strobe signals supplied from the microcomputer 8 to the key matrix circuit 7 as well as to temporarily store the voice information fetched from any one of the word ROMs 9, 10 and 11. The voice information stored in this buffer 62 is fed into a digital-to-analog converter 63 which converts it into analog signals and supplies these consequent signals to an amplifier 61. The amplifier 61 serves to amplify the analog signals as sound signals and provides them to the loudspeaker 48.

The microphone 47 as a sound conversion means converts the sound outputted via the user's mouth into electric signals and supplies the same to an amplifier 51. The sound inputs amplified through the amplifier 51 are fed into a gate circuit 52 and a level detector 53. The level detector 53 detects the level of the sound inputs and, when the level of the sound inputs is above a given level, supplies its output signal to a timing signal generator 54. The timing generator 54 produces a timing signal of a duration corresponding to an interval of circulating sound signals stored in a BBD (bucket brigade device) used as an analog memory 55 as discussed below. To this end the timing signal generator 54 is supplied with an input control signal $S_{in}$ from the microcomputer 8.

When being supplied with the input control signal $S_{in}$ and the output signal from the level detector 53, the timing signal generator 54 supplies the timing signal to the gate circuit 52 and a gate circuit 56. Upon receipt of the signal from the timing signal generator 54 the gate circuit 52 is open so that the sound signals amplified through the amplifier 51 are fed into the analog memory 55. The analog memory 55 is implemented with the above mentioned BBD or a CCD for storage of the sound signals in the form of analog signals. A clock oscillator 58 is provided in connection with the analog memory 55. The clock oscillation 58 provides two-phase clock pulses for the analog memory 55 to enable the latter to hold the sound signals. The output of the analog memory 55 is fed to a gate circuit 59 and an amplifier 57, with the latter amplifying the output of the analog memory 55 for the gate circuit 56. The gate circuit 56 is in closed position when being supplied with the output signal from the timing signal generator 54 and otherwise in open position.

Accordingly, the sound signals are amplified through the amplifier 51 and supplied to the analog memory 55 via the gate circuit 52 when timing signal is developed from the timing signal generator 54. After the lapse of that period, the sound signals are held in the analog memory 55 while circulating through a loop including the analog memory 55, the amplifier 57 and the gate circuit 56. A timing signal generator 60 produces timing signals to place a gate circuit 59 into open condition like the generator 54. With the gate circuit 59 in open condition the analog signals contained within the analog memory 55 are fed to an amplifier 61 and released through the loudspeaker 48.

Figure 3A:
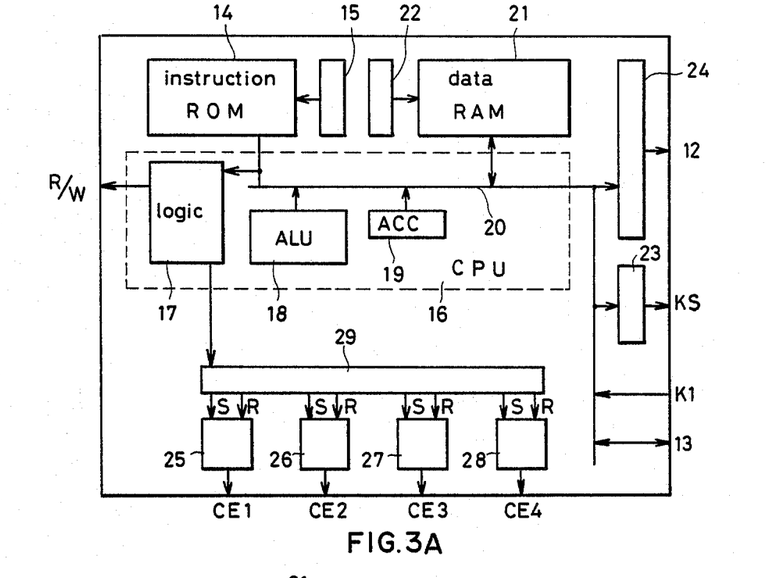
FIG. 3A is a block diagram of the internal construction of a microcomputer shown in FIG. 2.
Figure 3B:
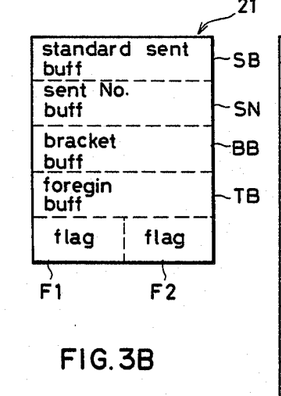
FIG. 3B is an illustration of data stored within a data RAM contained in the microcomputer.

FIG. 3A is a block diagram showing the internal structure of the one-chip microcomputer 8 as shown in FIG. 2 and FIG. 3B is an illustration of data contained with a data RAM 21 in the microcomputer. An instruction ROM 14 stores instructions (normally encoded) for execution of various functions of the electronic translator. The instructions are sequentially fetched from the ROM 14 by sequentially incrementing a ROM address register 15. When being supplied with the instructions, a central processing unit (CPU) 16 decodes such instructions and executes required operations. As is well known in the art, the one-chip microcomputer 8 further includes a control logic circuit 17, an arithmetic logic circuit 18, an accumulator (ACC) 19, an internal data bus 20, a data RAM 21 and a RAM address register 22. The data RAM serves as a temporary storage for data required for execution of the various functions and as a conditional flip flop for branching program steps.

More particularly, the data RAM 21, as shown in FIG. 3B, contains a standard sentence buffer SB for temporarily storing standard sentences, a sentence number buffer SN for storing the identifying numbers of the standard sentences stored in the buffer SB, a bracket buffer BB for temporarily storing words introduced via the keyboard 1, a foreign language standard sentence buffer TB for storing foreign equivalents to the standard sentences as stored in the standard sentence buffer SB, a flag region $F_1$ placed in set position when the standard sentence temporarily stored in the buffer SB includes parentheses and a flag region $F_2$ placed in set position when the analog memory 55 of FIG. 2 stores the sound signals. Through operation of the CPU 16, data are loaded into specific regions of the data RAM 21 as selected by the RAM address register 22 and unloaded from those regions into the CPU 16. An output buffer 23 is adapted to supply various control signals to the external of the microcomputer, for example, the input control signal $S_{in}$, an output control signal $S_{out}$, the key strobe signals KS, etc. The output signal from the key matrix circuit 7 is introduced as a key input signal K1 into the CPU 16. An address register 24 sets up addresses for the word ROMs 9, 10 and 11 as external memories and the RAM contained in the display driver control 6, with the output thereof being connected to the address bus 12. Increments, decrements and value settings of this address register are achieved through operation of the CPU 16. The CPU 16 is connected to the external memory data bus 13 as shown in FIG. 2 for data transmission from the external memories via the data bus 13. The direction of data transmission from the CPU 16 to the external memories and vice versa is controlled by the read/write signal R/W.

Flip flops 25 to 28 are placed into set or reset position through a setting and resetting logic circuit 29 which is governed by output signals from the CPU 16. The output signals of these flip flops 25 to 28 are the chip select signals $CE_1$ to $CE_4$.

Figure 4A:
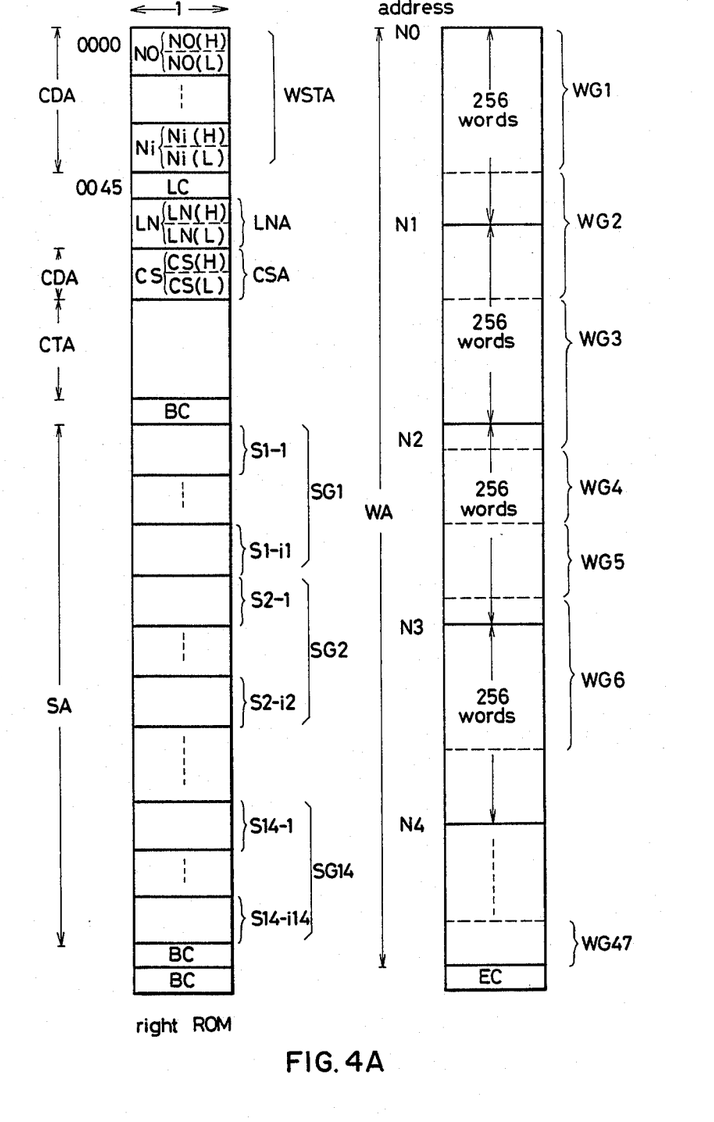
FIG. 4A shows a format of a word ROM.
Figure 4B:
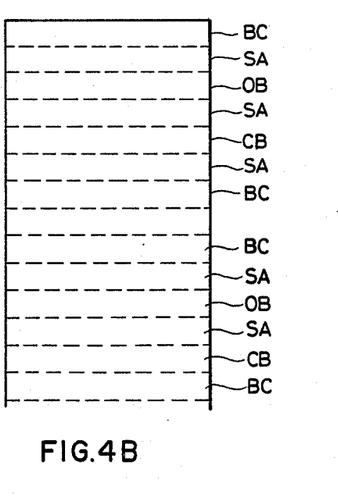
FIG. 4B shows a format of voice information stored within the word ROM.

FIGS. 4A and 4B are format diagrams of the word ROMs. In FIG. 4A, the word ROM is generally classified into a control data region CDA, a compression table region CTA, a sentence region SA and a word region WA. It is to be understood that each of the words is stored in a compressed form without the spellings thereof being stored as such. For example, in the case of the English ROM, a spelling "AN" is converted into a single compression code (1 byte code) $CC_1$ and another spelling "BA" is converted into a compression code $CC_2$. Similarly, a number of spellings with a high frequency of occurrence are selected in advance and converted into corresponding compression codes for storage. The relationship between the selected spellings and the compression codes is stored in the compression table region CTA. When an agreement between an input word and any one of the words stored in the word ROMs is to be sensed, the translator classified the input word into any one of several groups including the corresponding compression code pursuant to the compression table and compares the same with words contained in the word ROM one by one. When it is desired to display the words stored in the word ROM, the compression table is also employed. The compression table is different from language to language and is designed to achieve the highest compression factor for each of the languages.

As an example, the words are grouped into 47 categories and stored from category to category (in FIG. 4, $WG_1$ represents a word group of category #1, $WG_2$ represents a word group of category #2, $WG_3$ represents a word group of category #3, $WG_4$ represents a word group of category #4, $WG_5$ represents a word group of category #5, $WG_6$ represents a word group of category #6, ... $WG_{47}$ represents a word group of category #47).

Each of the sentences is also made up of a family of the compressed words. All of the sentences are similarly classified into 14 categories and stored category by category (in FIG. 4, $SG_1$ represents a storage region for a group of sentences $S_{1-1} \ldots S_{1-i1}$ belonging to category #1, $SG_2$ represents a storage region $SG_2$ for a group of sentences $S_{2-1} \ldots S_{s-i2}$ belonging to category #2, ... $SG_{14}$ is a storage region for a group of sentences $S_{14-1} \ldots S_{14-i14}$). It is noted that each of the 1st through 14th word categories corresponds to the same categories in the sentence region SA.

The words are grouped every 256 words and the head address of of each group of words (more strictly speaking, the head character address of the first word or the address of the region containing the compression code and as shown as $N_0, N_1, N_2, N_3, N_4$, etc.) is stored as a word start address within a word start address table region WSTA. Since in the illustrated embodiment the address is represented in 2 bytes, each of the start addresses is divided into an upper byte ($N_0(H) \ldots N_i(H)$) and a lower byte ($N_0(L) \ldots N_i(L)$). The word start address table has the effect of shortening a period of time required for retrieving a word corresponding to a specific identifying number. A start address storage region CSA for the sentence region is adapted to store the start address CS (CS(H)) and CS(L)) of the sentence region SA.

A storage region LNA stores a word identifying number LN(LN(H) and LN(L)) identifying a word characteristic of the language in interest. The word characteristic of the language is defined as follows. For example, with the English ROM, a word "ENGLISH" (that is, a word characteristic of the language in interest in the word ROM) is contained among the words stored therein. The word identifying number LN for the language of interest identifies the word indicating the language name of that word ROM. It is noted that the word identifying number shows the (n)th address of a specific word counted from the first word in the word region WA.

FIG. 4B is an illustration of part of the voice information storage retgions of the word ROMs. Each of the sentences to be audibly delivered is partitioned with a boundary code BC. The standard start address is stored in the next succeeding region, for example, the start address for the above mentioned sentence "I BOUGHT THIS IN". A code OB representing an opening parenthesis, the standard start address SA for "ENGLISH" and a code CB representing a closing parenthesis follow in the named order. The opening and closing parenthses OB and CB are treated as replace codes and a word or phrase between the parentheses is converted into the voice information as derived via the user's mouth.

Figure 5A:
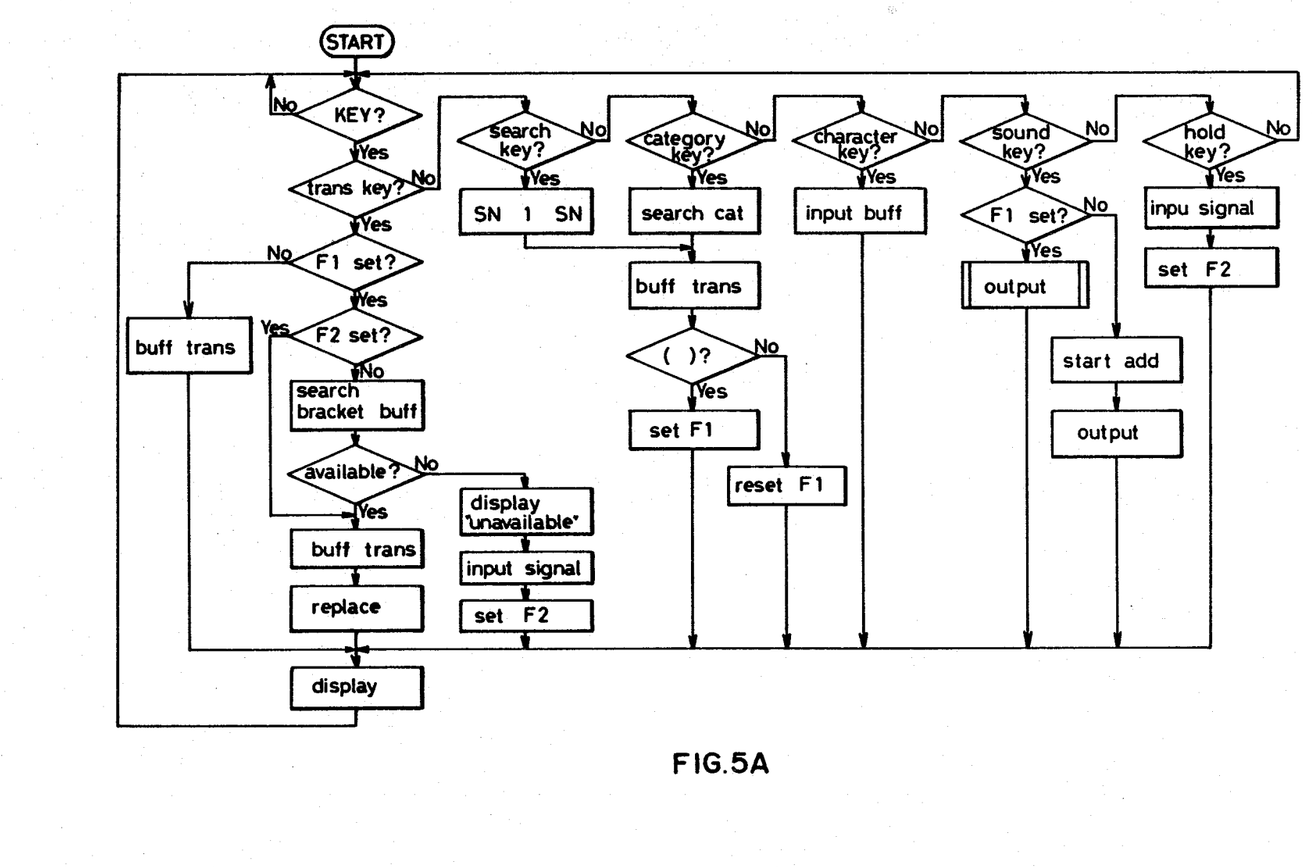
FIGS. 5A and 5B are flow charts for explaining operation of the embodiment of the present invention.
Figure 5B:
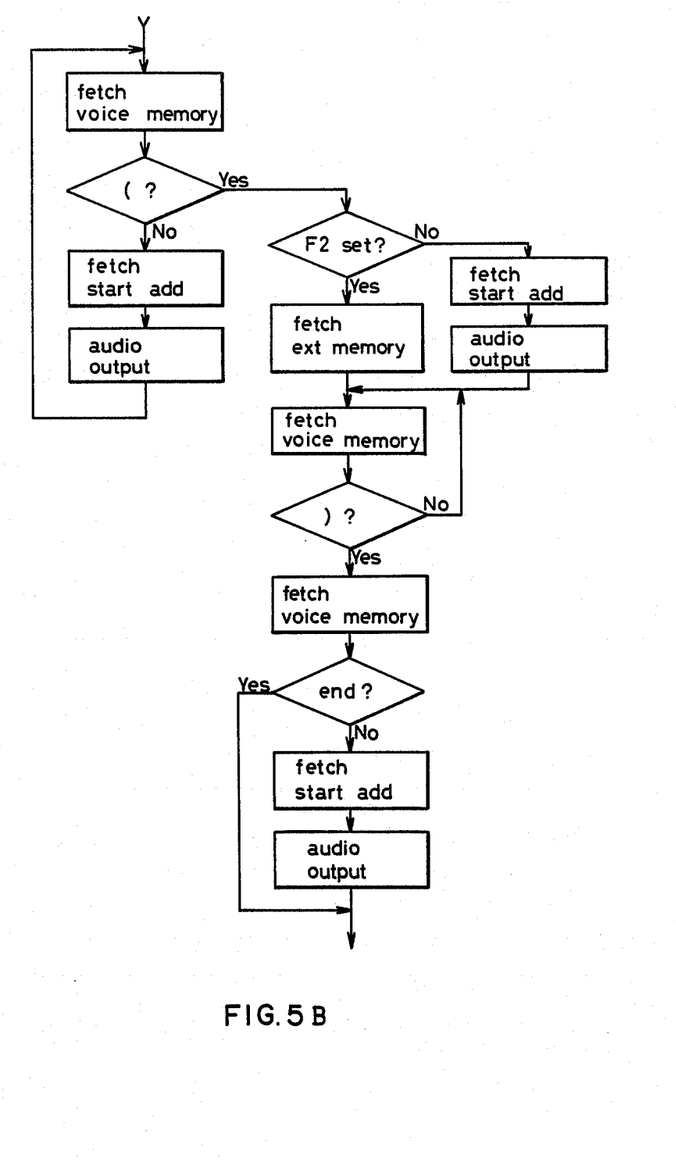

FIGS. 5A and 5B are flow charts for explanation of operation of the illustrated embodiment of the present invention. Any one of the category keys 43 is actuated by the user. Upon such actuation of the category keys the key matrix circuit 7 feeds a corresponding key code signal to the microcomputer 8. The microcomputer 8 constantly checks if any key code signal has been fed and, if so, identifies what key has been actuated. Once the category key actuated has been determined, the standard sentence corresponding to that actuated category key is searched and fetched from one of the word ROMs 9, 10 and 11. This standard sentence is loaded into the data RAM 21. Thereafter, the microcomputer 8 determines whether the standard sentence stored in the buffer SB contains the opening parenthesis or the closing parenthesis, If so, the flag $F_1$ is placed into set position while otherwise it is in reset position. The standard sentence is displayed on the character display 3 by loading the code corresponding to a display pattern into the memory within the display driver control 6. This mode of display is well known.

The user then actuates the search key 42 while viewing the standard sentence on the display 3. Having decided that the search key 42 has been actuated, the microcomputer 8 operates to fetch the standard sentence stored in the next succeeding storage region SA of any one of the word ROMs 9, 10 and 11. Retrieval of those standard sentences is achieved by counting the boundary codes between the adjacent standard sentences. To this end the standard sentence identifying number SN is incremented by "1" and the corresponding ones of the standard sentences are loaded into the standard sentence buffer SB each time the search key 42 is actuated. The standard sentence so stored appears on the character display 3.

The parenthesized character may be modified after a desired standard sentence appears on the character display 3. That is, one or more of the alphabet keys are actuated to introduce a replacing word whereupon the microcomputer 8 places the input word into the bracket buffer BB. At the same time the input word is also placed into the parenthesized portion of the standard sentence stored in the standard sentence buffer SB. The resultant modified standard sentence appears on the character display 3.

Upon actuation of the translation key 41 the standard sentence on the character display 3 is translated into another language. Having sensed the translation key 41 actuated, the microcomputer 8 decides whether the flag $F_1$ is in set position. If the flag $F_1$ is not in set position, or if the standard sentence in the buffer SB contains no parenthesis, then a foreign equivalent to that standard sentence is fetched from any one of the word ROMs 9, 10 and 11 and placed into the foreign language standard sentence buffer TB. The foreign standard sentence is visually displayed on the character display 3 instead of the previously displayed standard sentence. Should the flag $F_1$ be in set position, the translator then determines as to whether the flag $F_2$ is in set position. With the flag $F_2$ not in set position, the contents of the bracket buffer BB are searched. This is acheived by word-to-word comparison between the words in the word storage region WA and the contents of the bracket buffer BB. If the word storage region WA is completely scanned and the end code BC is sensed, the translator treates this as a corresponding standard sentence being missing. As long as that a general noun other than proper nouns is not contained within any one of the word ROMs 9, 10 and 11, the translator treats the corresponding standard sentence as being missing. In this case, "standard sentence unavailable" appears on the character display 3.

When the message "standard sentence unavailable" appears on the character display 3, the user speaks the word introduced within the parentheses toward the microphone 47. As is clear from FIG. 2, his voice is converted into electric signals by means of the microphone 47 and fed to the amplifier 51. The level detector 53 monitors the level of the sound signals amplified via the amplifier 51 and, when the level is over the predetermined level, provides the output signal for the timing signal generator 54. The microcomputer 8, on the other hand, supplies the input control signal $S_{in}$ to the timing signal generator 54 in response to the "unavailable" message. As a result, the timing signal generator 54 develops the timing signal and forces the gate circuit 52 to open position and the gate circuit 56 to closed position. With the gate circuit 52 in open position, the sound signals amplified via the amplifier 51 are loaded into the analog memory 55. After supplying the input control signal $S_{in}$, the microcomputer 8 places the flag $F_2$ into set position because of the sound signals being stored in the analog memory 55.

If the user can predict that a newly introduced word within the parentheses is not loaded into any one of the word ROMs 9, 10 and 11, he need actuate the hold key 46 and then the translation key 41. That is, as long as the hold key 46 has been actuated, the microcomputer 8 immediately supplies the input control signal $S_{in}$ to the timing signal generator 54. When the user pronouces the sound signal corresponding to the word within the parentheses after actuation of the hold key 46, the sound signals are introduced into the translator. Having supplied the input control signal $S_{in}$, the microcomputer 8 forces the flag $F_2$ into set position. It is obvious from the foregoing that, if a desired standard sentence is available, then the word within the parentheses is replaced with the foreign equivalent.

After the sound signals corresponding to the parenthesized word in the standard sentence buffer SB are audibly inputted via the user's mouth and loaded into the analog memory 55, the sound key 45 is actuated for an audible indication of a translated full sentence. Upon such actuation of the sound key 45 the microcomputer 8 identifies that key code and decides whether the flag $F_1$ is in set position. If the answer is negative or if the standard sentence in the buffer SB is not parenthesized, then the voice information corresponding to the start address of that standard sentence is fetched from any one of the word ROMs 9, 10 and 11 and loaded into the buffer 62. The voice information is further converted into the analog signals, amplified via the amplifier 61 and outputted via the loudspeaker 48.

If the flag $F_1$ is in set position or if the standard sentence is parenthesized and the parenthesized word is modified with one of the words already loaded into the word ROMs 9, 10 and 11, then the voice information corresponding to the full sentence other than the parenthesized word is fetched from the word ROMs 9, 10 and 11. The microcomputer 8 determines whether the first word in the standard sentence contained in the buffer SB follows the opening parenthesis. In other words, if the standard sentence is "I BOUGHT THIS IN", then the start address of the first word "I" is sensed and the voice information associated with the start address is fetched from any one of the word ROMs 9, 10 and 11 for audio output through the speaker 48. Provided that the code characteristic of the opening parenthesis is present as a result of repeated execution of the above procedure, the translator decides if the flag $F_2$ is in set position. With the flag $F_2$ not in set position or if an equivalent to the parenthesized word is present in any one of the word ROMs 9, 10 and 11, then the start address of that word is sensed and the corresponding voice information is delivered via the speaker 48.

The flag $F_2$ is in set position when the parenthesized word is not present in any one of the word ROMs but in the analog memory 55. In other words, the microcomputer 8 supplies the output control signal $S_{out}$ to the timing signal generator 60 which in turn develops the timing signal and opens the gate circuit 59. Therefore, the sound inputs in the analog memory 55 are fed to the amplifier 61 via the gate circuit 59 and outputted in an audible form through the speaker 48. Thereafter, the microcomputer 8 decides if the next succeeding word from the buffer SB is the closing parenthesis. If not, the voice information is fetched from any one of the word ROMs 9, 10 and 11 according to the standard sentence start address. The voice information which follows the closing parenthesis is further fetched.

The translator machine further decides if the boundardy code follows or if the last word has been fetched from the standard sentence buffer SB. In the event that the last word has not been fetched, the voice information corresponding to that word is fetched and audibly outputted. If the last word bears the boundary code, then the translator machine completes all of the operations and returns its initial state.

Figure 6:
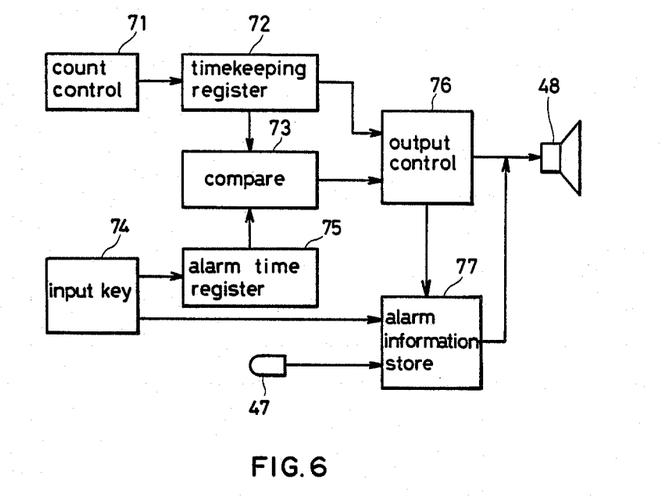
FIGS. 6 and 7 are schematic block diagrams showing another embodiment of the present invention.

FIG. 6 is a schematic block diagram of another embodiment of the present invention for use in a speech synthesizer timepiece. An input key device 74 is used to introduced an alarm setting and time information introduced via the input key device 74 is stored in an alarm time register 75. A counter control 71 is adapted to develop a standard clock pulse for supply to a timekeeping register 72 which may be for example implemented with a 24 hour working counter. A comparator 73 compares the output of the timekeeping register 72 and that of the alarm time register 75 applied thereto. If both agree, the comparator 73 provides its output signal for a time information audio output control 76 which is also supplied with updated time information from the timekeeping register 72. The output control 76 has previously stored voice information necessary for the delivery of an audio indication of time information. When the comparator 73 provides its output signal, an audible indication of the updated time information present in the timekeeping circuit 72 is delivered by means of the speaker 48. The input device key 74 includes a key for indicating sound inputs via the microphone 47 to be loaded into an alarm information storage 77. When this key is actuated and the user directs his voice toward the microphone 47, then that voice sound input is loaded into the alarm information storage 77 as voice information. When the comparator 73 provides its output signal (agreement) for the time output control 76, the voice information stored is delivered via the speaker 48.

For example, assuming an alarm time "7:00" is set, the output control 76 releases an audible messages "it's now 7:00" which is followed by an additional message "get up", for example. When a message "it's 7:30, go to the kindergarten" is required, "it's 7:30" is derived from the time information output 76 and "go to the kindergarten" from the alarm information storage 77.

Figure 7:
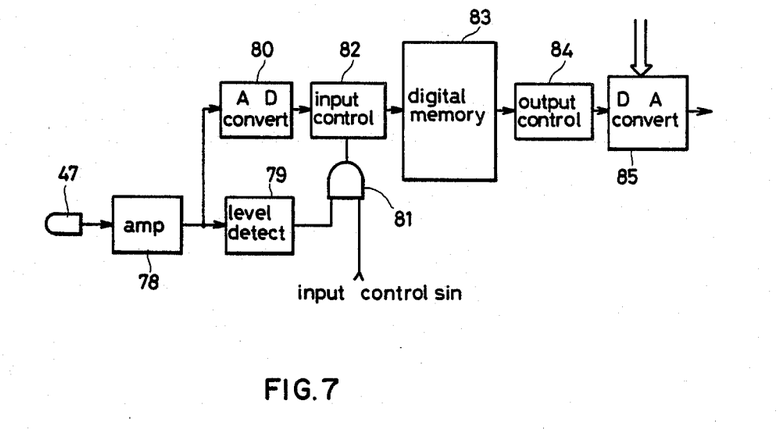

FIG. 7 illustrates still another embodiment of the present invention which includes a digital memory instead of the analog memory of FIG. 2 for the audio output device. Sound inputs via the microphone 47 are amplified via an amplifier 78 and monitored as to its level via a level detector 79. The output of the level detector is fed to an input of an AND gate 81 another input of which is supplied with the input control signal $S_{in}$ from the microcomputer 8. When the level of the sound inputs via the microphone 47 is over a fixed level and the input control signal $S_{in}$ is supplied from the microcomputer, the AND gate 81 is in open position to supply a control signal to an input control 82. The sound inputs amplified via the amplifier 78 and converter into digital information via an analog-to-digital converter 80 are supplied to the input control 82. Accordingly, when being supplied with the control signal from the AND gate 81, the input control 82 specifies an address of the digital memory 83 for storing the digital information as the sound signals. Through the output control 84 the digital information stored in the digital memory 83 is accessed and fetched. The digital information so fetched is converted into analog signals via a digital-to-analog converter 85.

Because the sound inputs via the microphone 47 are stored in the form of sound signals through the use of the digital memory 83, it is possible to eliminate the use of the analog memory of FIG. 2.

The invention being thus described, it will be obvious that the same may be varied in many ways. Such variations are not to be regarded as a departure from the spirit and scope of the invention, and all such modifications are intended to be included within the scope of the following claims.

What is claimed is:

1. A method for translating sentences from a first language to a second language and producing a voice output; comprising the steps of:

selecting one standard sentence in said first language from a plurality of standard sentences stored in a first word memory;

sensing an interchangeable word slot in said one standard sentence and producing a first flag signal if such a slot is present;

inputting a replacement word into a bracket buffer if a first flagt signal is produced;

searching said first word memory for said replacement word and producing a first signal if said replacement word is not found;

inputting a voice signal, representative of said replacement word, into a voice buffer through a microphone means and producing a second flag signal indicative of a voice signal being present in said voice buffer if said first signal is produced;

producing a translation signal, said translation signal being a translation into a second language of said one standard sentence if no flag signals are produced, said translation signal being a translation into a second language of said one standard sentence including said replacement word in said interchangeable slot if only said first flag signal is produced, and said translation signal being a translation of said one standard sentence except for said interchangeable slot if said first and second flag signals are produced;

accessing voice information corresponding to said translation signal from a second memory containing a plurality of standard sentences and words of said second language; and outputting an audible message, said audible message including said accessed voice information, said audible message also including said voice signal from said voice buffer if said first and second flag signals are produced.

2. A language translator device having interchangeable word capabilities with voice output, comprising:

first memory means for storing a plurality of words and a plurality of standard sentences of a first language and voice information associated with each of said words and said standard sentences of sadi first language;

second memory means for storing a plurality of words and a plurality of standard sentences of a second language and voice information associated with each of said words and said standard sentences of said second language;

selection means for choosing one standard sentence from said plurality of standard sentences of said first language and storing said one standard sentence in a standard sentence buffer;

slot detection means for sensing an interchangeable word slot in said one standard sentence stored in said standard sentence buffer and producing a first flag signal if such a slot is present;

key input means for inputting a replacement word into a bracket buffer;

searching means for determining if a word corresponding to said replacement word in said bracket buffer is contained in said first memory means, said searching means producing a first signal to indicate that such a word is not contained in said first memory means;

microphone means, responsive to said first signal, for enabling the input of a voice signal representative of said replacement word and producing a second flag signal indicating that said voice signal is available;

third memory means for storing said voice signal;

translation means, responsive to said first and second flag signals, for producing a translation output in said second language, said translation output being a first translation in said second language of said one standard sentence in said standard sentence buffer if no flag signals are present, a second translation in said second language of said one standard sentence with said replacement word from said bracket buffer area included in the interchangeable word slot if only said first flag signal is present, or a third translation in said second language, of said one standard sentence except for said interchangeable word slot if said first and second flag signals are present; and voice output means, responsive to said first and second flag signals, for producing an audible voice message, said voice message including a representation of said translation output by accessing voice information associated with said translated output from said second memory means, said audible voice message also including said voice signal, stored in said third memory means, in said interchangeable word slot, if said first and second flag signals are present.

* * * * *